United States Patent
Kumar et al.

(10) Patent No.: US 9,680,740 B2
(45) Date of Patent: Jun. 13, 2017

(54) SERVICE MULTIPLEXING AND DEMULTIPLEXING USING A SINGLE PSEUDOWIRE SERVICE/LABEL SWITCHED PATH LABEL IN A MULTIPROTOCOL LABEL SWITCHING NETWORK

(71) Applicant: Broadcom Corporation, Irvine, CA (US)

(72) Inventors: Vivek Kumar, Bangalore (IN); Santhosh Kumar Chandrasekar, Salem (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 301 days.

(21) Appl. No.: 14/085,707

(22) Filed: Nov. 20, 2013

(65) Prior Publication Data

US 2015/0131668 A1    May 14, 2015

Related U.S. Application Data

(60) Provisional application No. 61/901,744, filed on Nov. 8, 2013.

(51) Int. Cl.
*H04L 12/723* (2013.01)
*H04L 12/725* (2013.01)
*H04L 29/06* (2006.01)
*H04L 12/721* (2013.01)

(52) U.S. Cl.
CPC ........... *H04L 45/50* (2013.01); *H04L 45/30* (2013.01); *H04L 45/68* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 6,788,681 | B1 * | 9/2004 | Hurren | H04L 12/4641 370/389 |
| 7,158,515 | B1 * | 1/2007 | Wang | H04L 45/00 370/392 |
| 7,277,386 | B1 * | 10/2007 | Ferguson | H04L 45/04 370/230 |
| 2005/0169275 | A1 * | 8/2005 | Jiang | H04L 45/50 370/392 |
| 2011/0116796 | A1 * | 5/2011 | Zheng | H04L 12/4633 398/45 |
| 2011/0134830 | A1 * | 6/2011 | Lin | H04L 45/24 370/328 |

(Continued)

OTHER PUBLICATIONS

RFC 3032, MPLS Label Stack Encoding {https://tools.ietf.org/html/rfc3032} (Jan. 2001).*

*Primary Examiner* — Vinncelas Louis
(74) *Attorney, Agent, or Firm* — McDermott Will & Emery LLP

(57) ABSTRACT

A system for packet transmission over an MPLS tunnel may include a plurality of network devices. The network devices may include ingress and egress routers and intermediate routers. The system may be configured to use payload type indication labels and payload type headers to transmit packets from a plurality of user devices having different payload types and service instances over a single pseudo-wire service in a label switched path of the MPLS network.

19 Claims, 11 Drawing Sheets

(56) References Cited

U.S. PATENT DOCUMENTS

2013/0091349 A1* 4/2013 Chopra ................ H04L 63/162
                                                713/150
2014/0359275 A1* 12/2014 Murugesan ......... H04L 63/0428
                                                713/153

* cited by examiner

SERVICE MULTIPLEXING AND DEMULTIPLEXING USING A SINGLE PSEUDOWIRE SERVICE/LABEL SWITCHED PATH LABEL IN A MULTIPROTOCOL LABEL SWITCHING NETWORK

CROSS-REFERENCE TO RELATED APPLICATIONS

The present application claims the benefit of priority under 35 U.S.C. §119 from U.S. Provisional Patent Application Ser. No. 61/901,744 entitled "PROVIDING PACKET TRANSMISSION THROUGH MULTIPROTOCOL LABEL SWITCHING TUNNELS," filed on Nov. 8, 2013, the disclosure of which is hereby incorporated by reference in its entirety for all purposes.

TECHNICAL FIELD

The present description relates generally to packet processing and, in particular, relates to packet transmission through multiprotocol label switching (MPLS) tunnels.

BACKGROUND

In typical Multiprotocol Label Switching (MPLS) networks, intermediate nodes, such as Label Switch Routers (LSRs), do not have any visibility on what kind of payload is being carried within the Multiprotocol Label Switching tunnels of the network. With growing demand for cloud based services, improving Quality of Service (QoS) and performing deep packet inspection are of concern. Further, while ingress and egress nodes, such as Label Edge Routers (LERs), do have visibility as to the payload, typical implementations of pseudo-wire service and Label Switched Path (LSP) require a unique pseudo-wire service/LSP label for each different payload type. With a growing number of services that each node has to support, there is an increasing burden of control protocol required. For example, a provider edge router may have two different customer edge devices attached, one being Asynchronous Transfer Mode (ATM) based and one being Ethernet based. Separate pseudo-wire service labels are required to uniquely identify and transfer the ATM cells and the Ethernet packets, and the provider edge router needs to tell an attached provider router that both pseudo-wire service labeled payloads need to be encapsulated to the same LSP.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
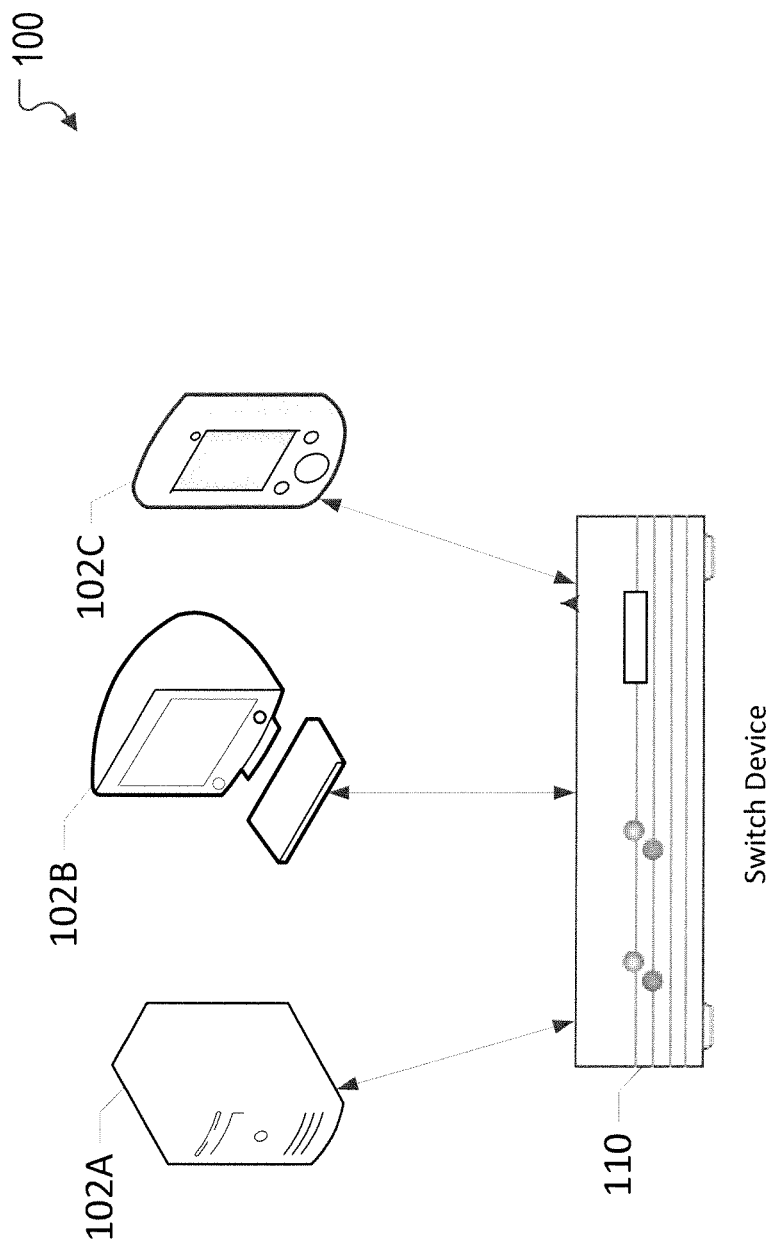
FIG. 1 illustrates an example network environment in which a system for packet transmission over an MPLS tunnel may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for providing packet transmission over an MPLS tunnel, a reserved label called a Payload Type Indication Label (PTIL) is used to indicate what payload type the pseudo-wire service label or LSP label is carrying. In addition, the PTIL is followed by a Payload Type Header (PTH). The PTH may be a 32 bit word consisting of 1) a one bit C field indicating whether the packet is data or control, a three bit reserved field, an eight bit payload type field indicating the type of payload (e.g., IPv4, IPv6, Ethernet, ATM, PPP, Frame Relay), and a twenty bit service identifier field identifying the service instance to which the payload belongs. Accordingly, the presence of the PTIL in a packet signifies that a PTH follows in the packet.

In accordance with one or more implementations of the subject system, an intermediate router (e.g., LSR) can parse an MPLS label to find the PTIL reserved label. Here, the presence of the PTIL causes the LSR to scan the PTH to determine if the packet is a data packet or a control packet and what kind of payload the packet is carrying. Based on this information, the LSR can do deep packet inspection and parse the payload specific information to apply better QoS and to achieve customer specific Service Level Agreements (SLAs). Further, based on the C bit indication in the PTH, the LSR can easily apply a different priority service to control packets versus data packets, providing a more granular level of packet control.

In accordance with one or more implementations of the subject system, only one pseudo-wire service is needed to transport multiple types of packets/payloads (e.g., ATM cell, Ethernet packet) from a provider edge router through an attaching provider router. Here, the PTIL indicates the presence of the PTH, and the service identifier field of the PTH identifies the different users and/or services. For example, a provider edge router may have three customer edge devices connected, where one customer edge device is ATM based and the other two customer edge devices are Ethernet devices belonging to different users. The payload type field of the PTH for the ATM device will indicate that the payload is ATM and the service identifier field will indicate the service instance of an ATM based customer edge device. For the two Ethernet devices, the payload type field of the PTH will indicate that the payload is Ethernet and the service identifier field will indicate the service instance of an Ethernet based customer edge device, where the two different Ethernet customer edge devices will have different service identifiers. Thus, only one pseudo-wire service is required for all three different customer edge devices, thereby saving signaling overhead between an ingress provider edge router and a provider router. The larger the number of varying customer edge devices using one pseudo-wire service, the greater the signaling overhead savings.

FIG. 1 illustrates an example network environment 100 in which a system for packet transmission over an MPLS tunnel may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 may include various electronic devices 102A-C such as one or more servers, computers, network components, network devices, etc. In one or more implementations, one or more of the electronic devices 102A-C may represent a set of servers, a server bank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as the network device 110, may be implemented to facilitate communication between the one or more electronic devices 102A-C of the network environment 100. The electronic devices 102A-C of the network environment 100, may be connected or otherwise in communication with each other, through or using the network device 110. For example, the electronic devices 102A-C may each be coupled to a physical port of the network device 110 by a network transmission line, such as an Ethernet transmission line, a coaxial transmission line, an optical transmission line, or generally any transmission line. In one or more implementations, one or more of the electronic devices 102A-C may be wirelessly coupled to the network device 110.

The network device 110 may be a switch device, routing device, such as any layer 3 routing device, or generally any network device that routes data, such as packets. For example, the network device 110 may be any of a customer edge device, a provider edge router and a provider router. A combination of customer edge devices, provider edge routers and provider routers may form a network environment 100, as discussed below with respect to FIGS. 8 and 9. The network device 110 may include one or more memory modules that store packet format information for MPLS packet processing. The packet format information may include a PTIL and a PTH. The PTH may include control bit information, payload type information and service identifier information. The packet format information may include a reserved field for additional packet processing information. Example packet format information is discussed further below with respect to FIGS. 4 to 7, and an example network device 110 is discussed further below with respect to FIG. 2. The network device 110 and/or one or more of the electronic devices 102A-C, may be, or may include one or more components of, the electronic system discussed below with respect to FIG. 11.

The electronic devices 102A-C transmit packets to the network device 110, and the network device 110 may transmit or forward some or all of the packets to other network devices. The packets may each include packet processing information. For example, headers of the packets may include a PTIL, as well as a PTH having a control field, a payload type field and a service identifier field. The network device 110 receives the packets, determines if there is a PTIL indicating the presence of a PTH, validates a control bit, payload type and service identifier lookup, and takes action on the packets (e.g., forwarding) based at least on the control bit, payload type and service identifier lookup.

In one or more implementations, the system for packet transmission over an MPLS tunnel may provide visibility of payload in intermediate nodes in MPLS tunnels. The system may provide for an intermediate router (e.g., LSR) to parse the MPLS label to locate the PTIL, the PTIL being followed by the PTH. The fields of the PTH indicate to the intermediate router whether the packet is a data packet or a control packet and what kind of payload the packet is carrying (e.g., IPv4, IPv6, Ethernet, ATM). With this information, the intermediate router can do deep packet inspection and parse the payload specific information (e.g., source IP, destination IP, TCP/DP port). The intermediate router may use the parsed specific information to apply improved QoS and SLA for packet transmission. An example process for providing visibility of payload in LSR/intermediate nodes in MPLS tunnels is discussed further below with respect to FIG. 10.

In one or more implementations, the system for packet transmission over an MPLS tunnel may provide for transporting packets having different payload types between the same endpoint using a common pseudo-wire service. Here, packets having different payload types and/or different service instances may need to be routed between the same two endpoints (e.g., two customer edge devices). For example, the payload type and service identifier fields of the PTH may identify the different user and/or services of the multiple packets, which may then be combined using one pseudo-wire service over an LSP. An example process for packet transmission over single pseudo-wire service of an MPLS tunnel is discussed further below with respect to FIG. 10.

In one or more implementations, the system or architecture for packet transmission over an MPLS tunnel may be applied across networks, such as SONET/SDH, Ethernet and Fiber Channel networks, for example. In one or more implementations, the system or architecture for packet transmission over an MPLS tunnel may include network specific processors and/or general processors implementing network functions.

In one or more implementations, the system or architecture for packet transmission over an MPLS tunnel may include a configurable register to provide what value the PTIL should use in a packet and a configurable register to provide what value of payload type corresponds to which type of packet. In one or more implementations, the system or architecture for packet transmission over an MPLS tunnel may include a lookup table for performing a lookup for payload type and service identifier to determine the context of the customer edge device sending or receiving the packet.

In operation, the network device 110 performs a lookup for incoming packets having a PTIL to determine the value of the PTIL. After identifying the PTIL value, the network device 110 performs a lookup of the PTH to determine the value of the payload type corresponding to a type of packet. The network device 110 may perform deep packet inspection and parse the payload specific information to provide better QoS and SLA performance, where the network device 110 is an intermediate router. The intermediate router network device 110 may also determine if the packet is a data or control packet, provide a different priority of service for a control packet than for a data packet. Further, network device 110 may combine packets having different payload types and/or service instances for transmission over a single pseudo-wire service, where the network device 110 is an ingress or egress provider edge router.

Figure 2:
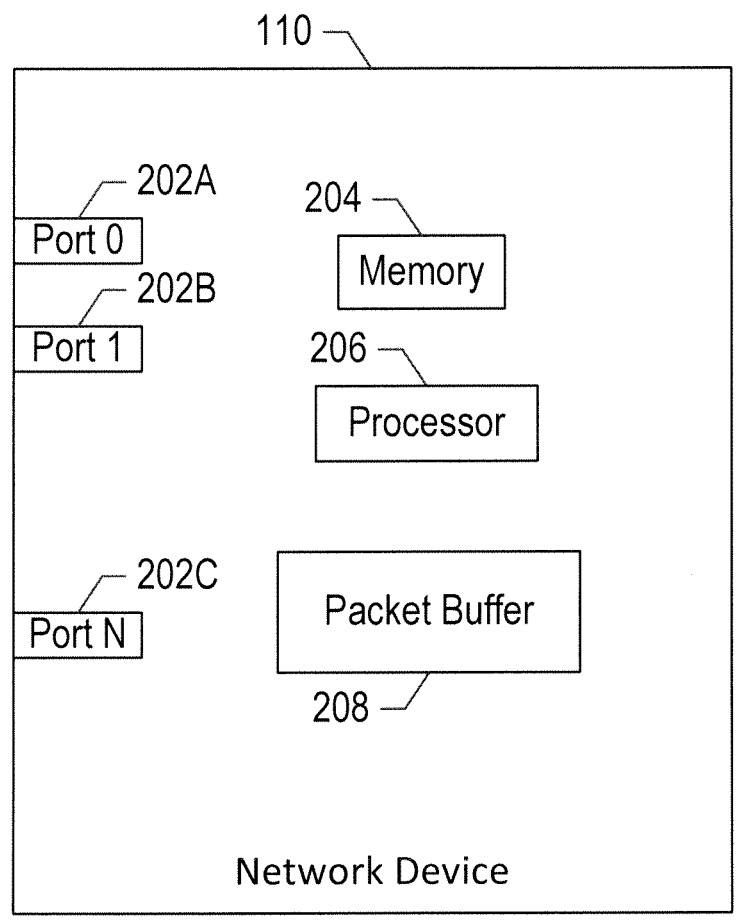
FIG. 2 illustrates an example network device that may implement a system for packet transmission over an MPLS tunnel in accordance with one or more implementations.

FIG. 2 illustrates an example network device 110 that may implement a system for packet transmission over an MPLS tunnel in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 110 includes ports 202A-C, a memory 204, a processor 206, and a packet buffer 208. The memory 204 may store the packet lookup table for the network device 110. For explanatory purposes, the memory 204 is illustrated as a single block; however, the memory 204 may include one or more disparate memory modules and/or different types of memory modules, such as TCAM, random access memory (RAM), static random-access memory (SRAM), dynamic random-access memory (DRAM), double data rate synchronous dynamic random-access memory (DDR SDRAM). In one or more implementations, the entire routing table may be stored in one type of memory, such as SRAM. In one or more implementations, portions of the packet processing results table may be stored in different types of memory. For example, packet forwarding information may be stored in SRAM, while packet edit information may be stored in TCAM. Thus, the packet forwarding information may include pointers to the packet edit information stored in TCAM.

In one or more implementations, the processor 206 may be a network processor, such as a packet processor, and may be, or may include, a forwarding engine. In one or more implementations, the processor 206, or a portion thereof, may be implemented in software (e.g., subroutines and code). In one or more implementations, the processor 206, or a portion thereof, may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The ports 202A-C may be physical ports over which packets are received and transmitted (e.g., from/to electronic devices 102A-C). The packet buffer 208 may be one or more types of memory, such as DRAM, that store packets that are received/transmitted over the physical ports. In one or more implementations, a packet may be received over one of the ports 202A-C (e.g., the port 202A). The packet may be queued in the packet buffer 208 (e.g., in an ingress queue) for processing by the processor 206. The processor 206 may retrieve the packet, and/or a header thereof, from the packet buffer 208 and may determine (e.g., based on the packet processing results stored in the memory 204) the packet processing required for the packet (e.g., forwarding the packet). The processor 206 may then queue the packet in a queue associated with a port (e.g., port 202B) and the packet may be subsequently retrieved from the packet buffer 208 and transmitted over port 202B.

Figure 3:
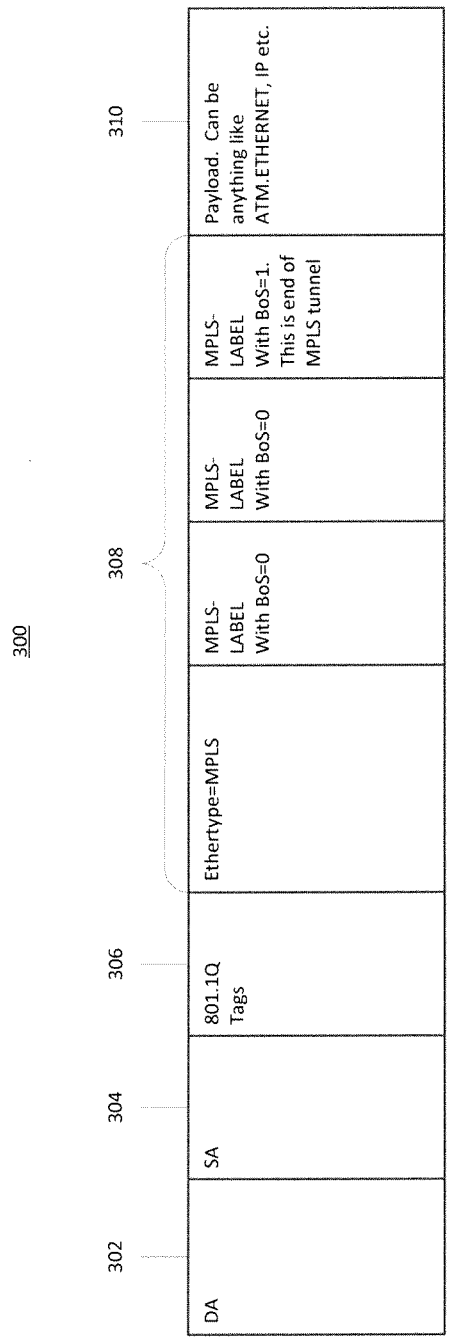
FIG. 3 illustrates an example packet format of an MPLS encapsulated packet.

FIG. 3 illustrates a packet format 300 of a typical MPLS encapsulated packet. The example packet format 300 includes a MAC-DA header 302, a MAC-SA header 304, VLAN tag(s) 306, MPLS label(s) 308 and a payload 310. In typical MPLS networks, other than ingress and egress routers (e.g., LERs), intermediate nodes or routers (e.g., LSRs) have no clue or knowledge about the kind of payload being carried by the packets routed through the intermediate nodes as the typical packet format 300 does not provide the ability for the intermediate node to determine that information. In addition, for packet processing by ingress and egress routers (e.g., LERs, provider edge routers), each type of payload or service instance requires a unique pseudo-wire service label (not shown).

Figure 4:
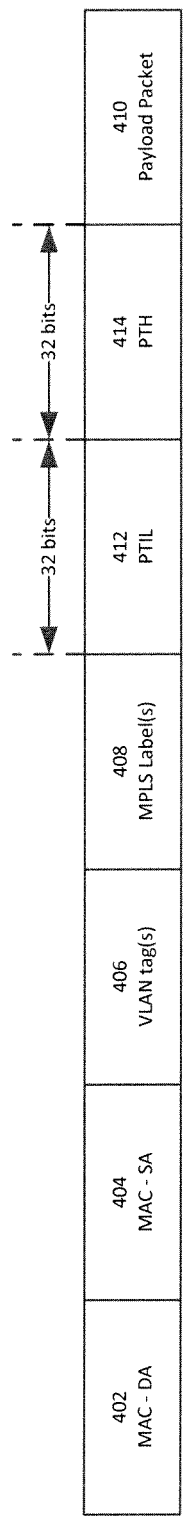
FIG. 4 illustrates an example packet format for packet transmission over an MPLS tunnel in accordance with one or more implementations.

FIG. 4 illustrates an example packet format 400 of a system for packet transmission over an MPLS tunnel in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example packet format 400 includes a MAC-DA header 402, a MAC-SA header 404, VLAN tag(s) 406, MPLS label(s) 408 and a payload 410. The example packet format 400 also includes a PTIL 412 and a PTH 414. In operation, the processor 206 uses the PTIL 412 to determine that a PTH 414 is present. In operation, the processor 206 uses the PTH 414 to determine whether to perform deep packet inspection, to parse the payload specific information, to provide priority service on the packet and/or to combine the packet with other packets for transmission over a single pseudo-wire service.

In accordance with one or more implementations of the subject system, the PTIL 412 may be a reserved label that is used from the MPLS 0-15 space. In accordance with one or more implementations of the subject system, the PTIL 412 may be an extended reserved label.

Figure 5:
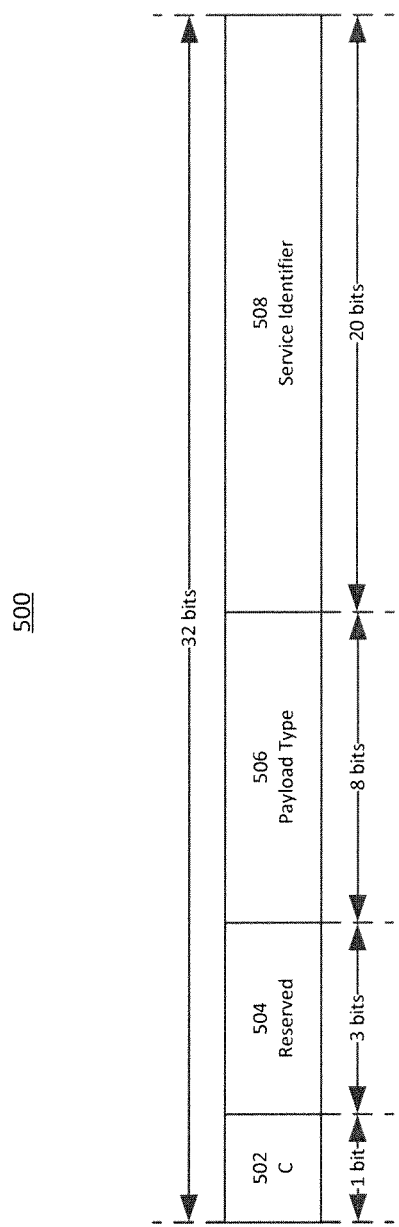
FIG. 5 illustrates an example header format for packet transmission over an MPLS tunnel in accordance with one or more implementations.

FIG. 5 illustrates an example header format 500 of a system for packet transmission over an MPLS tunnel in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example header format 500 includes a control field 502, a reserved field 504, a payload type field 506 and a service identifier field 508. The control field 502 may be 1 bit (e.g., a 0 or a 1) and may indicate whether the packet is a data packet or a control packet. For example, the processor 206 may place a higher priority on control packets over data packets and process or forward the control packets first. The payload type field 506 may be 8 bits and may indicate if the packet payload is IPv4, IPv6, Ethernet, ATM, PPP, Frame Relay, and the like. The service identifier field 508 may be 20 bits and may indicate the service instance to which the packet payload belongs (e.g., ATM, Ethernet). For example, the processor 206 may use the payload type field 506 and the service identifier field 508 to perform a more detailed or effective packet action on the packet in comparison to a packet that does not include a PTH 414.

In accordance with one or more implementations of the subject system, an ingress provider edge router may always know what type of payload the ingress provider edge router is transporting to an egress provider edge router. For example, the ingress provider edge router may add a PTIL 412 and a PTH 414 between a pseudo-wire service label and a payload of a received packet before transporting the revised packet to another packet routing device (e.g., provider router).

FIGS. 6A through 7C illustrate an example of one or more implementations, in which an ingress provider edge router is to transport ATM and Ethernet packets over a pseudo-wire service/LSP. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Figure 6A:
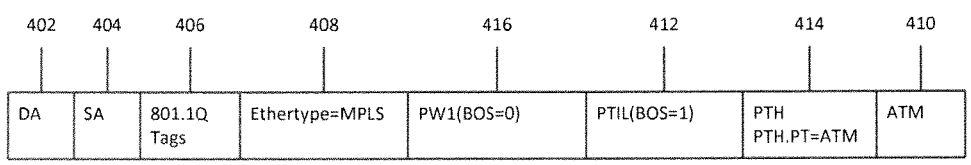
FIG. 6A illustrates an example packet format at an ingress provider edge router in accordance with one or more implementations.
Figure 6B:
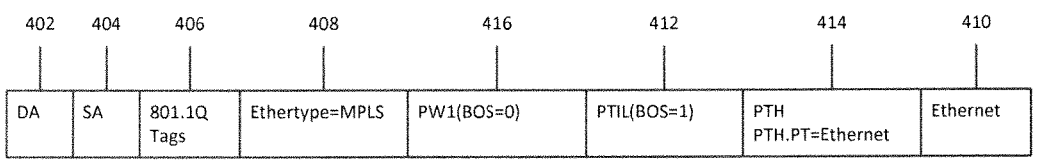
FIG. 6B illustrates an example packet format at an ingress provider edge router in accordance with one or more implementations.
Figure 9:
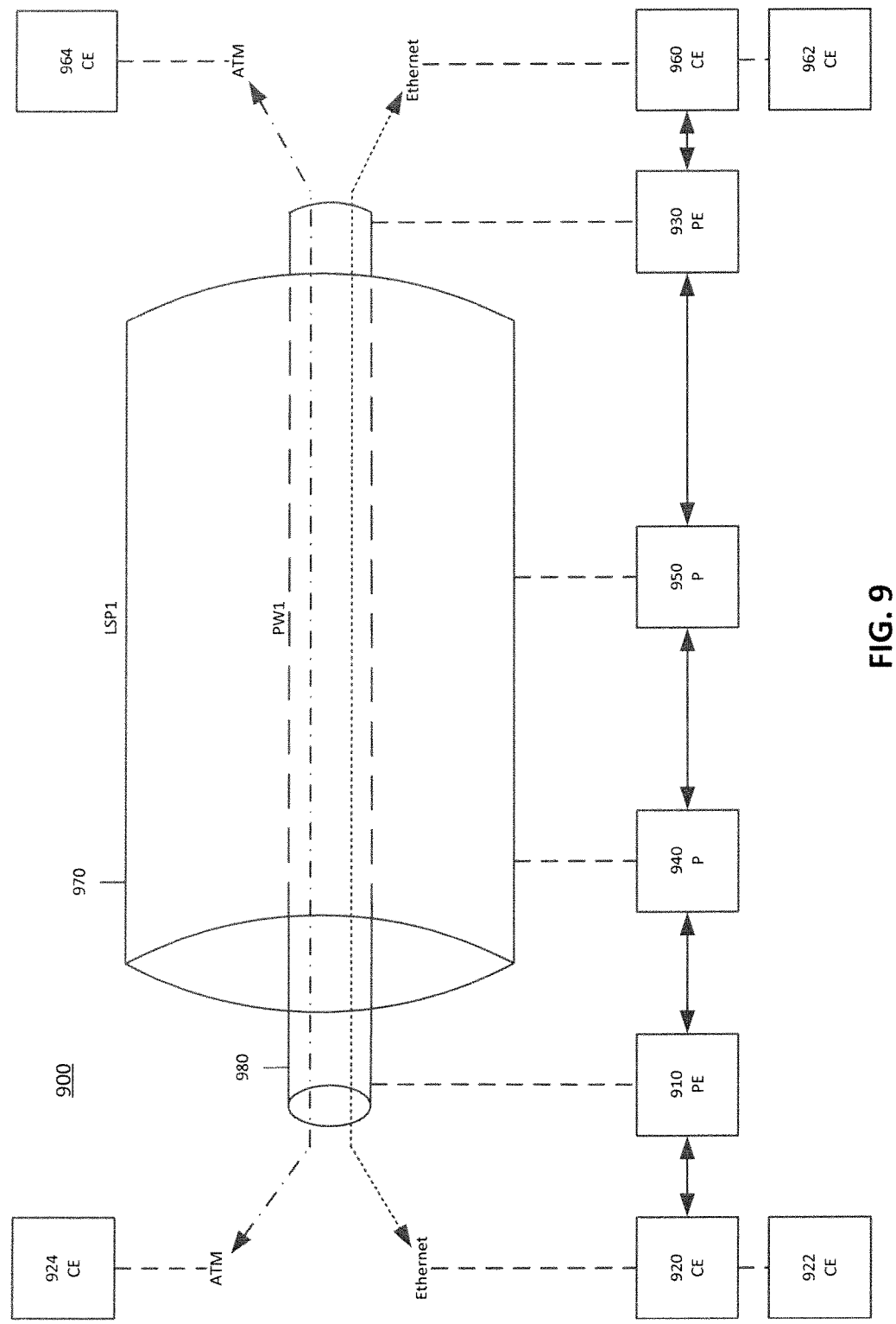
FIG. 9 illustrates an example of an MPLS packet transmission in accordance with one or more implementations.

In this example, the ingress provider edge router connects two customer edge devices (e.g., one customer edge device supporting ATM and the other customer edge device supporting Ethernet) to the other end of customer edge devices over an MPLS network having multiple provider routers (P1, P2). For example, a portion of the MPLS network topology may be designated as CE1, CE2→Ingress PE→P1→P2→Egress PE→CE1, CE2, as illustrated in FIG. 9. An ATM packet may be received from the ATM customer edge device at an ingress port of the ingress provider edge router, where the format of the packet at an egress port of the ingress provider edge router is shown in FIG. 6A. Here, a pseudo-wire service label 416 (PW1) has a bottom of stack (BOS) setting of 0, the PTIL 412 has a BOS setting of 1 and the payload type field of the PTH 414 indicates that the packet has an ATM payload. In addition, an Ethernet packet may be received from the Ethernet customer device at an ingress port of the ingress provider edge router, where the format of the packet at an egress port of the ingress provider edge router is shown in FIG. 6B. Here, the PW1 label 416 has a BOS setting of 0, the PTIL 412 has a BOS setting of 1 and the payload type field of the PTH 414 indicates that the packet has an Ethernet payload. The ingress provider edge router then transports these two packets to a first intermediate provider router (e.g., P1).

Figure 7A:
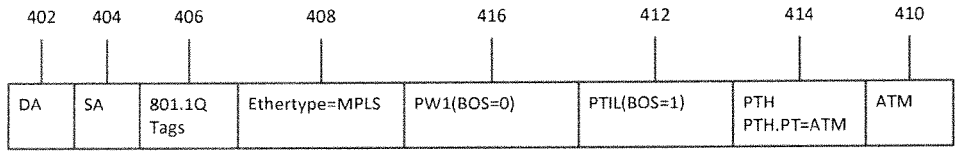
FIG. 7A illustrates an example packet format at a provider router ingress port in accordance with one or more implementations.
Figure 7B:
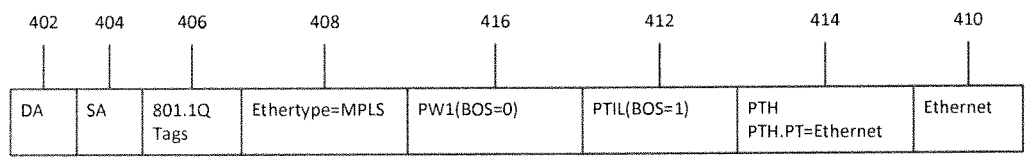
FIG. 7B illustrates an example packet format at a provider router ingress port in accordance with one or more implementations.

The ATM packet originating from the ATM based customer edge device may be received from the ingress provider edge router at an ingress port of the provider router, the format of the received packet which is shown in FIG. 7A. The PW1 label 416 has a BOS setting of 0, the PTIL 412 has a BOS setting of 1 and the payload type field of the PTH 414 indicates that the packet has an ATM payload. In addition, the Ethernet packet originating from the Ethernet based customer edge device may be received from the ingress provider edge router at an ingress port of the provider router, the format of the received packet which is shown in FIG. 7B. The PW1 label 416 has a BOS setting of 0, the PTIL 412 has a BOS setting of 1 and the payload type field of the PTH 414 indicates that the packet has an Ethernet payload.

Figure 7C:
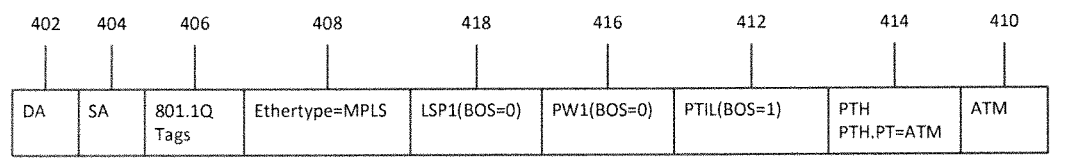
FIG. 7C illustrates an example packet format at a provider router egress port in accordance with one or more implementations.
Figure 7C:
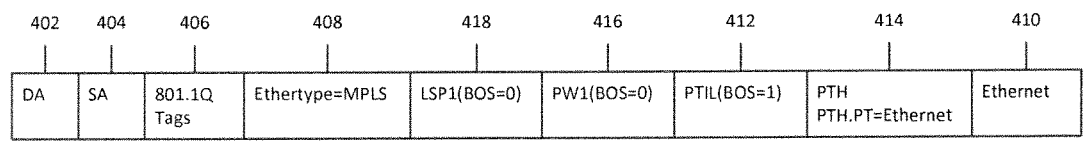

The provider router P1 may then transport the two packets to another device in the MPLS network, which in this example is the next intermediate provider router P2. The format of the packets at an egress port of the first provider router P1 is shown in FIG. 7C. Here, both packets have an additional label, LSP label 418 (LSP1), where the BOS has a setting of 0. Thus, both packets have the same pseudo-wire service label 416 and the same LSP label 418. Therefore, both packets may be transported over a single pseudo-wire service in the same LSP (e.g., both packets are transported over the same pseudo-wire service in an MPLS tunnel) regardless of the different payload and service instances of the two packets (e.g., ATM and Ethernet).

Figure 8:
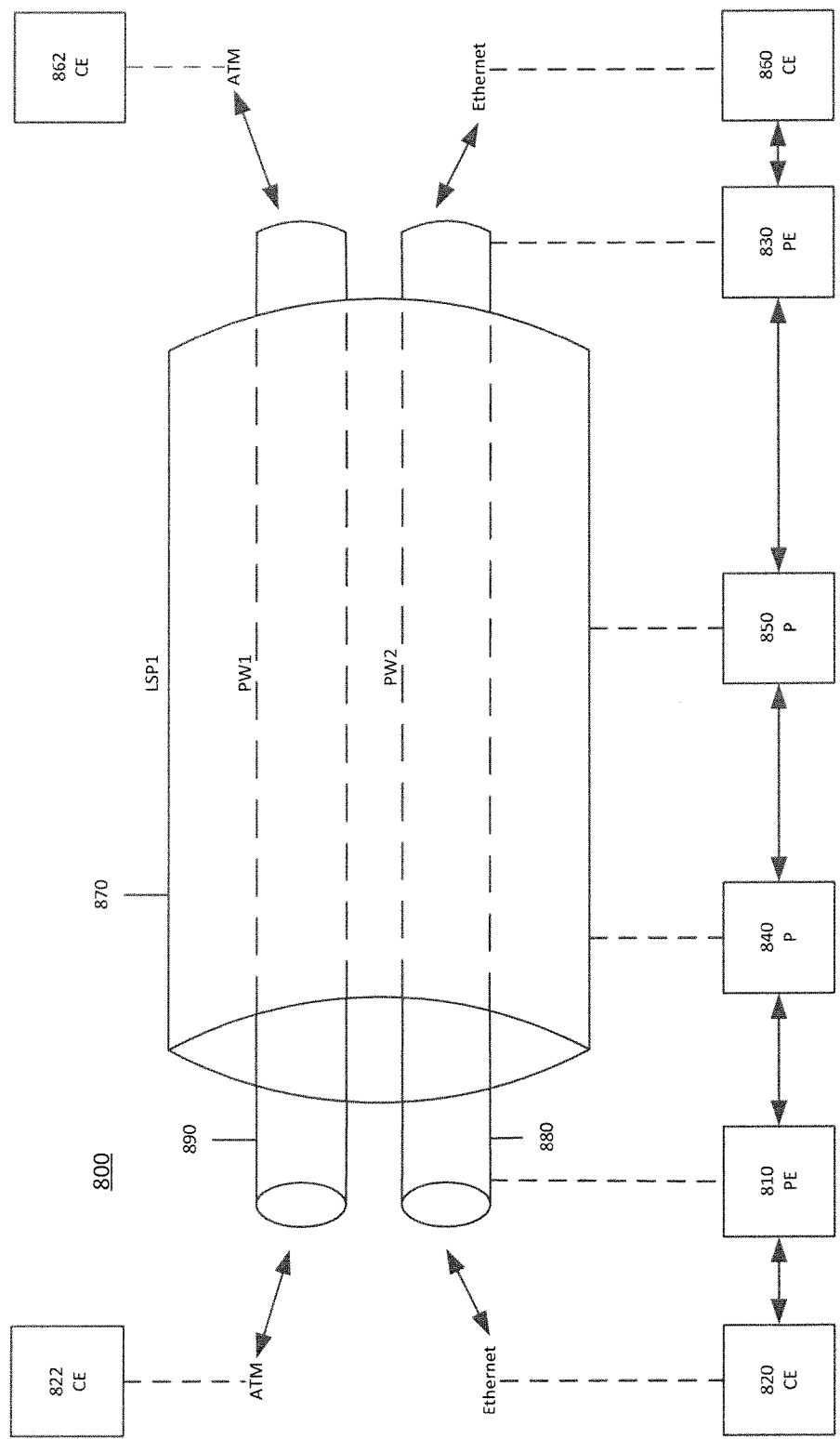
FIG. 8 illustrates an example of an MPLS packet transmission.

FIG. 8 illustrates an example of a typical MPLS pseudo-wire service architecture that requires a unique pseudo-wire service/LSP label to differentiate payload types. For example, a typical pseudo-wire service architecture uses pseudo-wire service label values to demultiplex different types of packets (e.g., ATM, Ethernet) to transmit over pseudo-wire services. Here, a first provider edge router 810 has two customer edge devices 820, 822 attached, where the customer edge device 820 is Ethernet based and the customer edge device 822 is ATM based. The first provider edge router 810 communicates with a second provider edge router 830 through a provider network shown here as provider routers 840 and 850. The second provider edge router 830 has two customer edge devices 860, 862 attached, where the customer edge device 860 is Ethernet based and the customer edge device 862 is ATM based.

The connection of the first and second provider routers 840, 850 provides a single label switched path (LSP1) 870, which is a single MPLS tunnel. Within the LSP1 870, there is a first pseudo-wire service 880 that services packet transmission between the Ethernet based customer edge devices 820, 860, and a second pseudo-wire service 890 that services packet transmission between the ATM based customer edge devices 822, 862. Thus, if the first provider edge router 810 is an ingress router that is transporting incoming packets from the customer edge devices 820, 822 to the MPLS tunnel 870, the first provider edge router 810 needs two different pseudo-wire labels PW1 and PW2 to uniquely identify and transport ATM cells and Ethernet packets.

FIG. 9 illustrate an example of one or more implementations, for which an MPLS pseudo-wire service architecture does not require a unique pseudo-wire service/LSP label to differentiate payload types. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Here, a first provider edge router 910 has three customer edge devices 920, 922, 924 attached, where the customer edge devices 920 and 922 are Ethernet based devices belonging to different users and the customer edge device 924 is ATM based. The first provider edge router 910 communicates with a second provider edge router 930 through a provider network shown here as provider routers 940 and 950. The second provider edge router 930 has three customer edge devices 960, 962, 964 attached, where the customer edge devices 860 and 862 are Ethernet based and the customer edge device 964 is ATM based.

The connection of the first and second provider routers 940, 950 provides a single label switched path (LSP1) 970, which is a single MPLS tunnel. Within the LSP1 970, there is a single pseudo-wire service 980 that services packet transmission between both the Ethernet based customer edge devices 920, 922, 960, 962 and the ATM based customer edge devices 924, 964. Thus, if the first provider edge router 910 is an ingress router that is transporting incoming packets from the customer edge devices 920, 922, 924 to the MPLS tunnel 970, the first provider edge router 910 only needs one pseudo-wire label PW1 to identify and transport both ATM cells and Ethernet packets through the MPLS tunnel 970 to the second provider edge router 930, which is an egress router in this case.

In accordance with one or more implementations of the subject system, the packet transport is bi-directional. Thus, the second provider edge router 930 may be the ingress router transporting traffic from any of the customer edge devices 960, 962, 964 over the MPLS tunnel 970 via the provider routers 940, 950 to the first provider edge router 910, which is now the egress router in this example. In accordance with one or more implementations of the subject system, any or all of the customer edge devices 920, 922, 924, 960, 962, 964, the provider edge routers 910, 930 and the provider routers 940, 950 may provide packet traffic in both directions at the same time or in an interleaved fashion. In either case, the ingress router may multiplex a plurality of incoming packets having different payload types and/or service instances for transport through the MPLS tunnel 970. Further, the egress router may demultiplex the multiplexed stream of packets received over the MPLS tunnel 970 back into packets or packet streams having different payload types and/or service instances.

In the above example illustrated in FIG. 9, the ingress provider edge router 910 only needs one pseudo-wire service 970 to transport ATM cells and Ethernet packets by using a PTIL and a PTH, with the service identifier field of the PTH identifying the different services and users. For example, the ATM portion may be designated as ATM→PTH, PTIL, PW1→LSP1→LSP1→PW1, PTIL, PTH→ATM. Here, the payload type field of the PTH indicates that the payload is ATM based and the service identifier field indicates that the service instance is an ATM based customer edge device. Similarly, the Ethernet portion may be designated as Ethernet PTIL, PW1→LSP1→LSP1→PW1, PTIL, PTH→Ethernet. Here, the payload type field of the PTH indicates that the payload is Ethernet based and the service identifier field indicates that the service instance is an Ethernet based customer edge device. The two different customer edge Ethernet device users have different service identifier fields to distinguish them from each other. Accordingly, only one pseudo-wire service 980 is required for all three different customer edge devices 920, 922, 924 transmitting packets through the first provider edge router 910.

Figure 10:
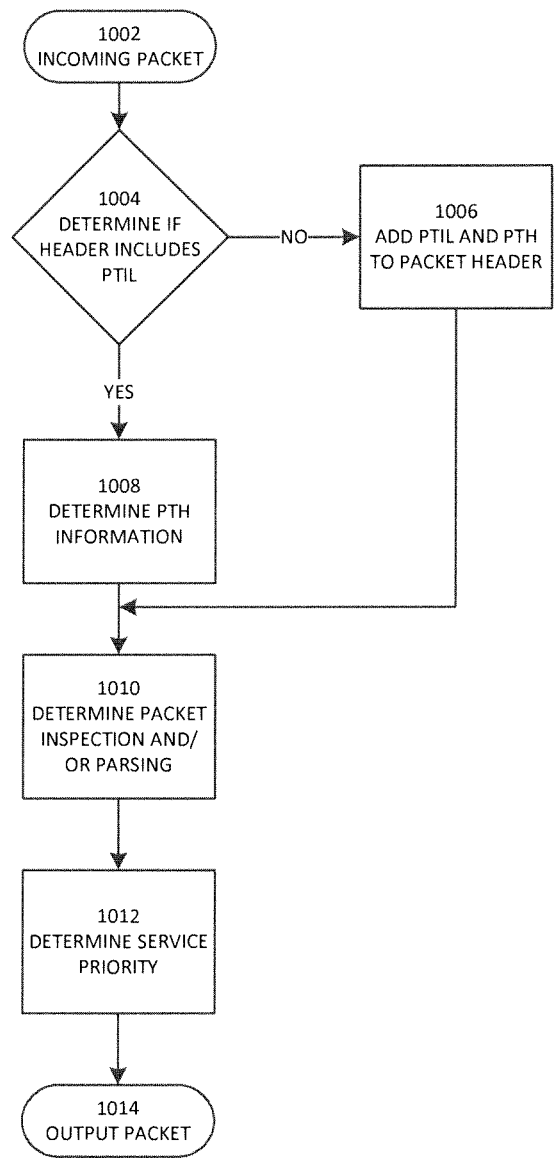
FIG. 10 illustrates a flow diagram of an example process for packet transmission over an MPLS tunnel in accordance with one or more implementations.

FIG. 10 illustrates a flow diagram of an example process 1000 for packet transmission over an MPLS tunnel in accordance with one or more implementations. For explanatory purposes, the example process 1000 is described herein with reference to the network device 110 of FIGS. 1 and 2. However, the example process 1000 is not limited to the network device 110 of FIGS. 1 and 2, and the example process 1000 may be performed by one or more components of the network device 110. Further for explanatory purposes, the blocks of the example process 1000 are described herein as occurring in serial, or linearly. However, multiple blocks of the example process 1000 may occur in parallel. In addition, the blocks of the example process 1000 need not be performed in the order shown and/or one or more of the blocks of the example process 1000 need not be performed.

The processor 206 of the network device 110 receives an incoming packet (1002). The processor looks at the header of the incoming packet to determine if there is a PTIL (1004). For example, the processor 206 may process the header of the packet to retrieve the value of the PTIL. If the packet header does not include a PTIL, the processor 206 may add a PTIL and a PTH to the packet header (1006). If the packet header includes a PTIL, the processor 206 may look up a PTH and determine packet information from the PTH (1008). For example, the processor 206 may process the PTH to determine whether the packet is a control packet or a data packet, to determine a payload type value and/or to determine a service identification value.

The processor 206 may perform packet inspection and/or parsing based on the determined PTH values (1010). For example, the processor 206 may perform deep packet inspection and/or parse the payload specific information (e.g., source IP, destination IP, TCP/UDP) to improve QoS and SLA performance. The processor 206 may also determine a priority of service for the packet based on the determined PTH values (1012). For example, the processor 206 may provide a different priority of service to control packets than to data packets.

The processor 206 may output the packet for transport to another device (1014). For example, the processor 206 may combine the packet with other packets having the same pseudo-wire service label value for transport over a single pseudo-wire service of an LSP. Here, the processor 206 may combine packets with ATM payload types from customer edge devices having ATM service instances and packets with Ethernet payload types from customer edge devices having Ethernet service instances for transport over a single pseudo-wire service.

Figure 11:
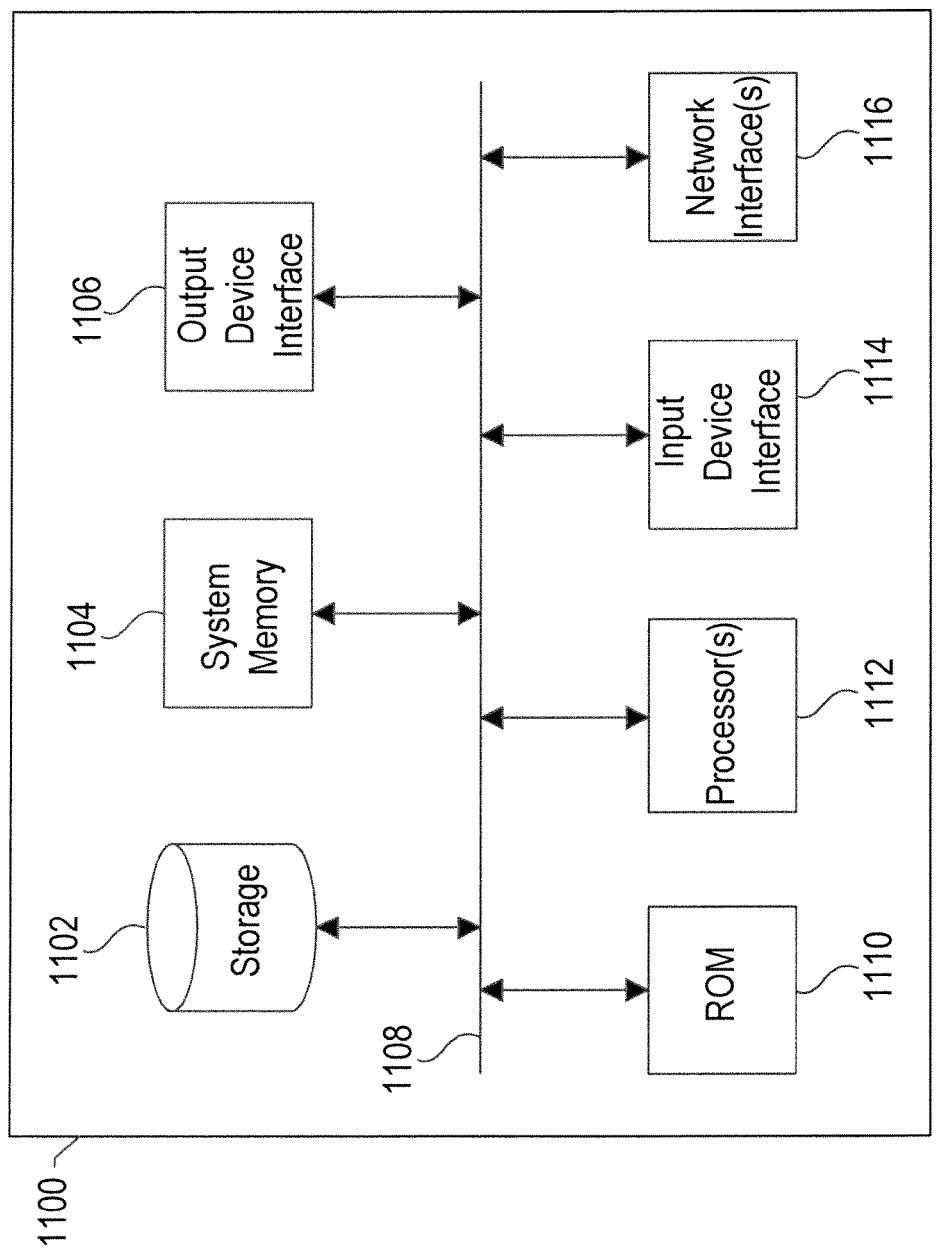
FIG. 11 conceptually illustrates an electronic system with which one or more implementations of the subject technology may be implemented.

FIG. 11 conceptually illustrates an electronic system 1100 with which one or more implementations of the subject technology may be implemented. The electronic system 1100, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 1100 can be, and/or can be a part of, the network device 110, and/or one or more of the electronic devices 102A-C. Such an electronic system includes various types of computer readable media and interfaces for various other types of computer readable media. The electronic system 1100 includes a bus 1108, one or more processor(s) 1112, such as the processor 206, a system memory 1104 or buffer, a read-only memory (ROM) 1110, a permanent storage device 1102, an input device interface 1114, an output device interface 1106, and one or more network interface(s) 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processor(s) 1112 with the ROM 1110, the system memory 1104, and the permanent storage device 1102. From these various memory units, the one or more processor(s) 1112 retrieve instructions to execute and data to process in order to execute the processes of the subject disclosure. The one or more processor(s) 1112 can be a single processor or a multi-core processor in different implementations.

The ROM 1110 stores static data and instructions that are needed by the one or more processor(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processor(s) 1112 may need at runtime. In one or more implementations, the processes of the subject disclosure are stored in the system memory 1104, the permanent storage device 1102, and/or the ROM 1110. From these various memory units, the one or more processor(s) 1112 retrieve instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 11, bus 1108 also couples electronic system 1100 to one or more networks (not shown), one or more electronic devices 102A-C, and/or content server 112, through one or more network interface(s) 1116. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 1100 can be a part of one or more networks of computers (such as a local area network ("LAN"), a wide area network ("WAN"), or an Intranet, or a network of networks, such as the Internet. Any or all components of electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used, for convenience only and do not limit the subject disclosure.

What is claimed is:

1. An intermediate node comprising:
a memory; and
at least one processor communicatively coupled to the memory, the at least one processor configured to:
receive, by the intermediate node, a packet over a multiprotocol label switching (MPLS) tunnel over which one or more other packets having different payload types and different service instances are communicated, the packet comprising a payload, a payload type indication label included in an MPLS label, and a payload type header that follows the payload type indication label and precedes the payload in the packet, wherein the payload type indication label indicates that the payload type header is present in the packet, and the payload type header indicates a type of payload that the packet contains and a type of service instance that the packet requires for transport;
perform, by the intermediate node, deep packet inspection on the packet and parsing the payload of the packet based at least in part on the payload type header when the payload type indication label indicates that the payload type header is present in the packet; and apply, by the intermediate node, a quality of service to the packet based at least in part on the deep packet inspection and the parsed payload of the packet when the deep packet inspection is performed.

2. The intermediate node of claim 1, wherein the payload type indication label comprises a thirty two bit field indicating a payload type indication label value.

3. The intermediate node of claim 1, wherein the payload type header comprises a one bit field indicating that the packet is one of a control packet and a data packet.

4. The intermediate node of claim 1, wherein the payload type header comprises an eight bit payload type field indicating the payload type of the packet.

5. The intermediate node of claim 1, wherein the payload type header comprises a twenty bit service identifier field indicating a service instance associated with the packet.

6. The intermediate node of claim 5, wherein the service instance is based on the service instance used by a customer edge device.

7. The intermediate node of claim 1, wherein the payload type header comprises a three bit reserved field.

8. The intermediate node of claim 1, further comprising:
a pseudo-wire service label, wherein the pseudo-wire service label indicates a common pseudo-wire service to be shared with the one or more other packets over the MPLS tunnel.

9. A system for providing packet transport through multiprotocol label switching (MPLS) tunnels, the system comprising:
an ingress packet processor configured to determine an intended path for incoming packets received from one or more network devices, add a payload type indication label and a payload type header to packets determined to have a same intended path, and pass the packets having the added payload type indication label and payload type header to an egress packet processor for transport over a single pseudo-wire service through an MPLS tunnel,
wherein at least two of the passed packets have different payload types and the payload type header of each of the packets is visible to at least one intermediate node of the MPLS tunnel, and a presence of the payload type header in each respective passed packet indicates to the at least one intermediate node whether to: perform deep packet inspection on each respective passed packet and apply a quality of service to each respective passed packet based at least in part on the deep packet inspection and a payload of each respective passed packet.

10. The system of claim 9, wherein the egress packet processor is configured to prioritize processing of each of the packets based on a payload type header field indicating whether the packet is a control packet or a data packet.

11. The system of claim 9, wherein the egress packet processor is configured to transport the passed packets over the single pseudo-wire service, wherein at least two of the passed packets are associated with different service instances.

12. A method comprising:
receiving, at a provider edge router, packets from a plurality of network devices;
configuring each received packet, by a processor, by adding to each of the packets a payload type indication label (PTIL) included in a multiprotocol label switching (MPLS) label and followed by a payload type header (PTH) that is accessible to at least one intermediate node of an MPLS tunnel, wherein the PTIL is configured to indicate that the PTH is present in the packet, and wherein the PTH is configured to indicate a type of payload that the packet contains and a type of service instance that the packet is associated with;
forwarding the configured packets to a provider router;
outputting, from the provider router, two or more of the configured packets for transport over a common pseudo-wire service over the MPLS tunnel, wherein at least two of the outputted configured packets having one of different payload types and different service instances;
receiving at least one of the outputted configured packets by the at least one intermediate node of the MPLS tunnel;
parsing, by the at least one intermediate node, the MPLS label of the at least one of the outputted configured packets to find the PTIL;
scanning, by the at least one intermediate node and responsive to finding the PTIL, the PTH of the at least one of the outputted configured packets to determine whether the at least one of the outputted configured packets is a data packet or control packet and to determine a type of payload carried by the at least one of the outputted configured packets;
performing, by the at least one intermediate node, deep packet inspection on the at least one of the outputted configured packets and parsing the payload of the at least one of the outputted configured packets based at least in part on the obtained PTH; and
applying, by the at least one intermediate node, a quality of service to the at least one of the outputted configured packets based at least in part on the deep packet inspection and parsed payload of the at least one of the outputted configured packets.

13. The method of claim 12, wherein a presence of the PTIL indicates a presence of the PTH.

14. The method of claim 12, wherein the PTH comprises a control bit field, a reserved field, a payload type field and a service identifier field.

15. The method of claim 12, wherein the configuring each received packet further comprises adding a pseudo-wire service label to each received packet.

16. The method of claim 15, further comprising:
combining two or more of the configured packets for transport over the common pseudo-wire service, wherein the two or more combined configured packets have a common same pseudo-wire service label.

17. A computer program product comprising instructions stored in a non-transitory computer-readable storage medium, the instructions comprising:
instructions to perform ingress packet processing on a plurality of incoming packets to add a payload type indication label (PTIL) followed by a payload type header (PTH) to each incoming packet, the incoming packets being received over one or more ingress ports of a network device;
instructions to combine a plurality of the processed packets for transport to another network device, wherein at least two of the processed packets have one of a different payload type and a different service instance; and
instructions to transport the combined processed packets over a single pseudo-wire service through a multiprotocol label switching (MPLS) tunnel, wherein the PTH of each respective combined processed packet indicates to at least one intermediate node of the MPLS tunnel whether to: perform deep packet inspection on each respective combined processed packet and apply a quality of service to each respective combined processed packet based at least in part on the deep packet inspection and a payload each respective combined processed packet.

18. The computer program product of claim 17, the instructions further comprising:
   instructions to add a pseudo-wire service label to each incoming packet, wherein the instructions to combine the plurality of processed packets is based on each processed packet having a same pseudo-wire service label value.

19. The computer program product of claim 17, wherein the PTH comprises a one bit control field, a three bit reserved field, an eight bit payload type field and a twenty bit service identifier field.

* * * * *